Figure 6:
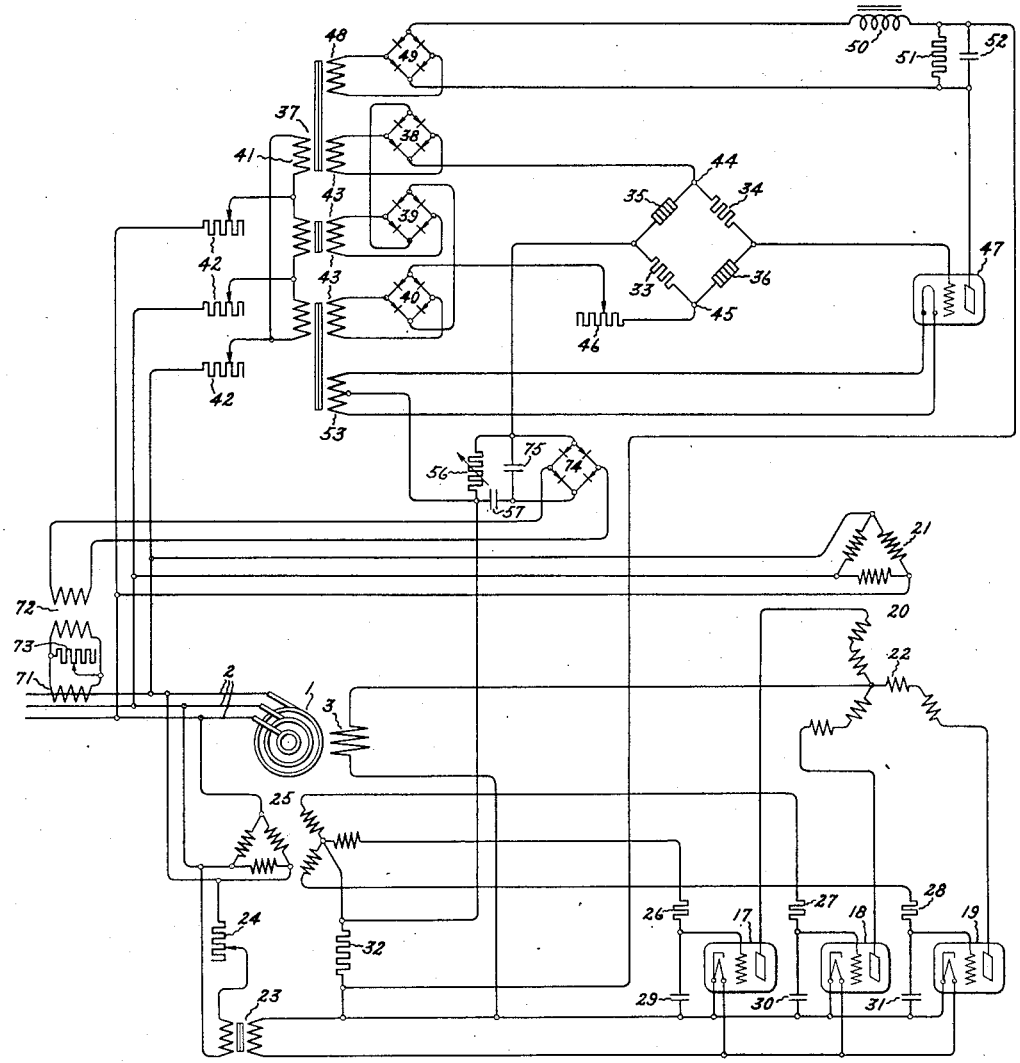

May 21, 1935.  G. W. GARMAN  2,002,371
REGULATING SYSTEM
Filed Dec. 1, 1930  2 Sheets-Sheet 1
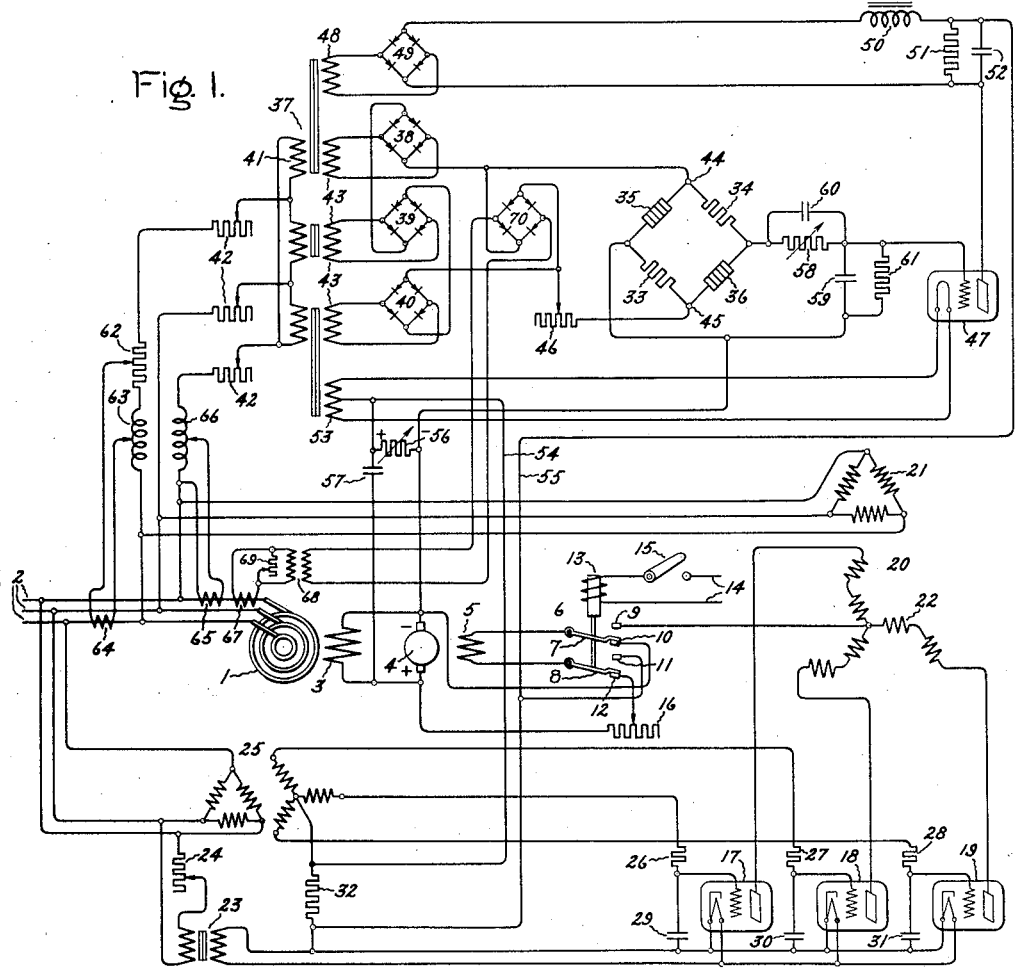
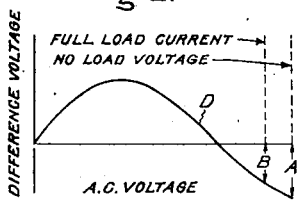
Fig. 2.
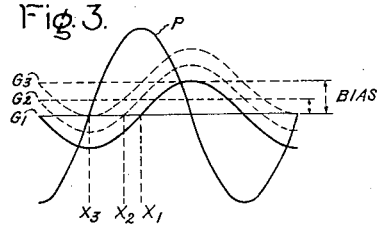
Fig. 3.
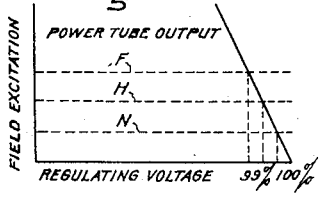
Fig. 4.
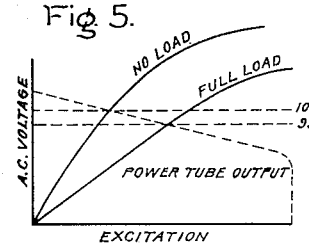
Fig. 5.
Inventor:
George W. Garman,
by Charles E. Mullen
His Attorney.

Patented May 21, 1935

2,002,371

UNITED STATES PATENT OFFICE 2,002,371

REGULATING SYSTEM

George W. Garman, Scotia, N. Y., assignor to General Electric Company, a corporation of New York Application December 1, 1930, Serial No. 499,380

31 Claims. (Cl. 171—119)

My invention relates to electrical regulating systems and more particularly to regulating systems employing electric discharge devices or electric valves for controlling an electrical characteristic of an alternating current generator.

Regulating systems are commonly employed to maintain a constant voltage at the terminals of a generator or at some distant point in the circuit supplied by the generator, irrespective of the current. Various regulating systems for generators employing electric discharge devices have been proposed in the past, but these arrangements are not generally suitable for commercial applications due to the absence of means to prevent hunting. Hunting, or oscillations in the generator voltage, is essentially caused by a time delay in some part of the generator circuit or in the regulating circuit. Although the electric discharge devices may eliminate the delay caused by the moving elements and relays of the usual mechanical type of regulator, a delay still exists due to the difference in rate of build-up of current in the exciter field and the alternator field. This latter delay is relatively small and tests have shown that if an instantaneous regulating device is used prohibitive hunting does not occur even in the absence of some means for preventing hunting. However, it has been found that the operation of the regulator is erratic, particularly under transient conditions occasioned, for example, by short circuits or switching, and that it is not practicable to operate the generator above its steady state power limit due to hunting. Hunting has also been found to exist even though the time delay or inertia has been eliminated from the regulator, and the alternator field has been excited directly, because of armature reaction. Armature reaction in the usual commercial alternator is relatively high due to the fact that close inherent regulation is no longer necessary and that the cost of such machines is materially reduced. For a commercially successful alternator regulating system it is, therefore, necessary to provide anti-hunting means to take care of the exciter field inertia and the effects of armature reaction if an exciter is used; and in case the exciter is eliminated anti-hunting means are still necessary to prevent hunting due to armature reaction.

It is an object of my invention to provide a new and improved regulating system that does not involve the use of moving contacts and is both sensitive and reliable in its operation.

Another object of my invention is to provide a new and improved regulating system employing electric discharge devices or electric valves for controlling an electrical characteristic of an alternating current dynamo electric machine.

A further object of my invention is to provide, in a regulating system employing electric discharge devices or electric valves for controlling an electrical characteristic of an alternating current generator, new and improved means for preventing prohibitive oscillations in the generator voltage, or hunting, within the operating range of the generator.

The novel features which I believe to be characteristic of my invention are set forth with particularity in the appended claims. The invention itself, however, both as to organizations and method of operation, together with further objects and advantages thereof, will best be understood by reference to the following description taken in connection with the accompanying drawings in which Fig. 1 is a diagrammatic representation of an embodiment of my invention for controlling an alternating current generator provided with an exciter; Figs. 2, 3, 4 and 5 are explanatory diagrams illustrating certain features in the operation of the apparatus illustrated in Figs. 1 and 6, and Fig. 6 is a diagrammatic representation of a modification of an embodiment of my invention for controlling alternators without the use of an exciter.

Referring to Fig. 1 of the drawings, a dynamo-electric machine 1, shown as a synchronous three phase alternator, is connected to supply power to a power circuit 2. The alternator 1 is provided with a field winding 3 which is supplied with an exciting current from a source of direct current shown as a direct current generator or exciter 4. The exciter 4 is provided with a field winding 5 which is normally connected to be energized through electric discharge devices or electric valves, to be described later. Preferably switching means 6, which may be manually or automatically operated, are provided to connect field winding 5 for self-excitation during the initiation of the operation of alternator 1. As shown by way of example the switching means 6 comprises two movable contacts 7 and 8 which, respectively, cooperate with stationary contacts 9 and 10 and 11 and 12. Means are provided for actuating the movable member of the switch and as shown comprises a solenoid 13 connected to be energized from any suitable source indicated by the conductors 14 through a manually operated switch 15. In the position illustrated movable contacts 7 and 8 complete a circuit through stationary contacts 10 and 12 so that field winding 5 is connected for self-excitation. An adjustable resistor is connected in circuit with field winding 5 in order to provide a control for the exciter voltage during the starting period.

The field winding 5, however, is normally connected to be energized from the terminals of the generator or any other suitable alternating current source through electric valves 17, 18 and 19, each provided with an anode, a cathode and a control electrode or grid. The electric valves 17, 18 and 19 are preferably of the gaseous or vapor electric type or any form of discontinuous control valve because of the greater current-carrying capacity of this type as now developed as compared to electric discharge devices of the pure electron discharge type in which the current flowing in the valve is continuously controlled by the potential upon the grid. The term discontinuous control type of electric valve is intended to mean that type of valve in which the starting of current in the valve is determined by the potential of its control grid but in which the current through the valve may be interrupted only by reducing the anode potential below its critical value. Transforming means 20 are provided for supplying current from the circuit 2 through the valves 17, 18 and 19 to the field winding 5. This transforming means comprises a primary winding 21 preferably delta connected and a secondary winding 22 preferably zig-zag-star-connected for eliminating direct current magnetization of the transformer cores. The anodes of the valves 17, 18 and 19 are connected respectively to different free terminals of the respective phase windings of the secondary winding 22. The neutral point of the star-connected secondary windings is connected to one side of field winding 5 through the contacts 7 and 9, and the circuit through the field winding is completed through contacts 8 and 11 to the cathodes of the valves. The cathode of each valve is connected to a heating source through any suitable means and as illustrated a transformer 23 is connected across one phase of the alternator terminals to energize the cathodes of each valve. An adjustable resistor 24 is provided in the primary circuit of the transformer 23 for controlling the heating current. The control electrode or grid of each valve is connected to the circuit 2 through a transformer 25 having a star connected secondary winding with its neutral point connected to the cathode circuit of the valves, and having its free terminals connected through grid resistors 26, 27 and 28 to the grids of valves 17, 18 and 19, respectively. Normally, this alternating voltage is substantially constant and is arranged by the illustrated arrangement of the windings of transformers 20 and 25, or by any other suitable means to lag the anode voltage by about 90 degrees. Since the valves are working into the field circuit which is a relatively high inductive load, substantially complete control can be obtained with a 90 degrees phase shift of the grid potential. With the grid voltage lagging the anode voltage by a fixed amount, the output will be nearly a minimum but to reduce the output of the valves to zero and also to provide a relatively low impedance path for current flow from the grid to the cathode, I provide condensers 29, 30 and 31 connected between the grids and cathodes of valves 17, 18 and 19 respectively. Control of the valves is obtained by adding a variable direct current voltage in series with the relatively fixed alternating voltage. As shown, this is accomplished in the illustrated embodiment by connecting a resistor 32 in the grid circuit of valves 17, 18 and 19 and varying the potential drop across said resistor by a direct current derived from the voltage determining circuit.

The voltage determining circuit includes a bridge circuit comprising resistance elements having a linear voltage current characteristic and resistance elements having a non-linear voltage current characteristic. Preferably the bridge circuit comprises four arms in the form of a Wheatstone bridge in which two opposite arms consist of resistance elements 33 and 34 having a linear voltage current characteristic and the remaining opposite arms consist of resistance elements 35 and 36 having a non-linear voltage current characteristic. I have found that a material having a non-linear voltage current characteristic which is particularly adapted for this purpose is a material having mechanical properties similar to those of dry process porcelain and consisting of silicon carbide and carbon or other conducting materials as defined and claimed in United States Letters Patent No. 1,822,742 granted September 8, 1931 upon an application of Karl B. McEachron.

In order to obtain regulation on all three phases, a three-phase rectifier is used to convert the three single phase voltages of the alternator into one direct current voltage which is a function of the voltages of all three phases. The bridge circuit is connected to be responsive to the alternator voltage by means of a transformer 37 and rectifiers 38, 39 and 40. Transformer 37 is provided with a primary winding 41 which as shown is connected in delta and to the circuit 2 through adjustable resistors 42 which are provided for adjusting the output voltage of the bridge. The transformer 37 is also provided with a plurality of single phase secondary windings 43. The various phase windings are connected respectively to the full wave rectifiers 38, 39 and 40. Full wave rectifiers are used in order to eliminate as much as possible the ripple appearing in the output circuit of the rectifier. This procedure is not necessary but improved performance is obtained. These rectifiers may be of any suitable type, but as shown I prefer to use rectifiers of the dry surface contact type, for example, copper oxide rectifiers of the type described and claimed in United States Letters Patent No. 1,640,335, granted August 23, 1927, upon an application of Lars O. Grondahl. The direct current output terminals of each rectifier are connected in series, and the free terminals of the terminal rectifiers 38 and 40 are connected to the input terminals 44 and 45 of the resistance bridge. An adjustable resistance 46 is connected in the circuit to the bridge for the same purpose as resistances 42, namely, for adjusting the bridge voltage. I have found it preferable, however, to make the major adjustments with the resistances 42. The output of the bridge circuit is connected to the grid of an electric discharge device, preferably of the pure electron continuous-control type, which is provided with an anode, a cathode and a grid. Two electric discharge devices connected in parallel, as is well understood in the art, may be used to increase the reliability of the circuit such that if one of these devices fails, the other will automatically carry the current, but for purposes of simplicity only one discharge device has been shown. This electric discharge device is used as a voltage amplifier in which variations in the anode current produce variations in the voltage drop across the controlling resistor 32 which is connected in the grid circuit of the electric valves 17, 18 and 19. The source of supply for the anode potential of the device 47 is obtained from the transformer 37 by means of an auxiliary secondary winding 48 which is connected in the anode circuit through a full wave rectifier 49, preferably of the same type as rectifier 38, and an electric wave filter comprising a reactor 50, a parallel connected resistor 51 and condenser 52. Heating current for the cathode of device 47 is obtained from the transformer 37 by means of a second auxiliary winding 53. The winding 53 is provided with an electrical midpoint connection which is connected to the neutral end connection terminal of resistor 32 by means of conductor 54. The other side of resistor 32 is connected to the upper direct current terminal of rectifier 49, as illustrated in the drawings, by means of conductor 55. Examining the relation of the anode circuit of device 47 and the grid resistor 32 of valves 17, 18 and 19, it will be observed that resistor 32 is included in series in the anode circuit of the discharge device 47 in the following circuit: the anode of the discharge device 47, lower output terminal of rectifier 49, the upper output terminal of rectifier 49, reactor 50, conductor 55, resistor 32, conductor 54, mid-tap of transformer winding 53, the cathode of the discharge device 47, through the discharge device and back to the anode.

In order to provide anti-hunting means to compensate for the time delay in the exciter, and that due to armature reaction, I interpose in the output circuit of the bridge and as shown in series with the conductor leading to the cathode of the device 47 an adjustable resistance 56. The potential drop across this resistance is varied in accordance with an electrical characteristic of the exciter 4, and as shown the voltage of exciter 4 is impressed across this resistance. A capacitor 57 is connected in series with the conductors leading to resistor 56 from exciter 4 thereby reactively connecting resistor 56 to exciter 4 in order that the voltage across resistor 56 due to the exciter will only appear during a transient condition in the excitation circuit, or in other words when the exciter voltage is changing. For the purpose of delaying the potential change of the grid so that the exciter anti-hunting circuit has an opportunity to prevent the exciter from prohibitively over-shooting, I connect a resistor 58 in the output circuit from the bridge and in the conductor leading to the grid of the electric discharge device, and a capacitor 59 from the grid side of resistor 58 to the other output terminal of the bridge. The resistor 58 determines the rate of build-up of voltage across the capacitor 59 and the rate of build-up of voltage across the capacitor determines the delay of building up of the grid potential. A capacitor 60 is connected in parallel with the resistor 58 in order to form a circuit in which a small change in the voltage impressed on the grid can be obtained quickly with a change in the alternator voltage, but which will not be large enough in magnitude actually to control the output of the valves 17, 18 and 19. A resistor 61 may also be connected in parallel to capacitor 59 in order to modify the period of time required for the grid potential to change. For purpose of analogy the resistor 58 and capacitor 59 may be considered as corresponding to the dashpot on a Tirrill type of regulator and the capacitor 60 may be considered as corresponding to the use of a spring between the piston of the dashpot and the main alternating current lever of the regulator whereby the main contacts may change momentarily independently of the dashpot. The features of damping and quick response and one form of the exciter anti-hunting circuit are disclosed and broadly claimed in a copending application of Alan S. FitzGerald and myself, Serial No. 498,416, filed November 26, 1930, and assigned to the assignee of the present application.

Line drop compensation and quadrature current compensation for paralleling of two generators can be applied if desired in a manner similar to the arrangement for mechanical regulators. A variable resistance 62 and variable reactance 63, the magnitudes of which may be adjusted so that the desired compounding can be obtained, are connected in one phase of the voltage applied to the regulating elements and as shown are connected in one of the conductors leading the transformer primary winding 41. A current transformer 64 furnishes the necessary potential when the line current is passed through the variable resistance and reactance thereby introducing a voltage into the regulating circuit which is both in phase and magnitude a function of the line drop. The delta voltages applied to the regulating element are unbalanced, and for a lagging power factor load the voltages applied to the regulating element are such as to tend to increase the regulated voltage over that obtained for the same load with a leading power factor load. In other words, normal line drop compensation is obtained.

When two or more synchronous generators are connected in parallel unless there is sufficient reactance between the two machines, it is necessary to provide some means for balancing the circulating quadrature component of current. For this purpose I provide another current transformer 65 in one of the phase conductors of circuit 2 and pass the current therefrom through a variable reactance 66 to produce a quadrature voltage which when added to the delta voltages of transformer primary 41 unbalances the voltages in the proper direction such that the current in the parallel machines is rendered proportional to their respective kv-a. ratings.

In the application of my regulating system to generators and synchronous condensers it may be desirable to provide a means for limiting the current output of the machine regulated and preferably to maintain the current output substantially constant after a predetermined current above the normal full load value is attained. For this purpose I provide means energized in accordance with the current output of the regulated machine for taking over the control of the control electrodes of the main valves when the output current of the machine reaches a predetermined value above its normal full load current. As illustrated a current transformer 67 is connected in one of the power conductors 2 and energizes an intermediate transformer 68. An adjustable resistor 69 is connected across the primary winding of transformer 68 for making adjustments for purposes of calibration. The secondary winding of the transformer 68 is connected to the input terminals of a suitable rectifier 70 which for example may be of the dry-surface contact type similar to rectifiers 38, 39 and 40. The direct current output terminals of the rectifier are connected in parallel to the input terminals of the bridge. The output voltage of rectifier 70 is so adjusted by means of resistor 69 that for any current below the predetermined overload value it is less than the rectified voltage from the rectifiers 38, 39 and 40. With the parallel arrangement of the rectifiers no reverse current condition will exist by virtue of the difference in output voltage of the two rectifier units because the rectifiers can only pass current in one direction. At the predetermined overload, however, the terminal voltage of the machine regulated will gradually decrease and just as soon as the output voltage of the rectifiers 38, 39 and 40 decreases below that of the rectifier 70, it will assume control and the input voltage of the bridge will not be determined by the output voltage of rectifier 70. With the voltage determining element under current control the regulating system will tend to hold a substantially constant current output just as the voltage is regulated in the manner hereinafter described.

In order to understand better the complete operating cycle it seems expedient to consider first the operating functions of the respective control elements. The alternating voltage from the circuit 2 is first stepped down to a suitable voltage, which may for example be 220 volts, by means of the transformer 37. This voltage is rectified by the rectifiers 38, 39 and 40. It will be observed that there is one rectifier unit for each phase. The voltages from the three phases of the alternator are rectified and impressed on the input terminals 44 and 45 of the voltage determining or bridge circuit. If the total direct current voltage impressed on this bridge circuit is of the correct value, corresponding to the value of the alternating voltage to be maintained, the output voltage of the bridge is zero or some predetermined value. If the alternating voltage is increased or decreased above or below the value which gives the balanced condition or predetermined unbalanced condition, an output voltage will be obtained which will be either positive or negative with respect to applied direct current voltage of the bridge depending upon whether the applied voltage is too high or too low. In addition this output voltage in magnitude is a function of the amount that the applied voltage deviates from that value which gives the balanced condition. The output voltage of the bridge is applied to the grid of the electric discharge device 47 whose operation in the regulating cycle will be explained presently.

The characteristic operating feature of the bridge circuit may be better understood by reference to Fig. 2 in which curve D shows in a general way the variation of the difference voltage plotted against the direct current input voltage which is a function of the alternating line voltage. It will be assumed that the bridge is adjusted until the difference voltage A is obtained at the rated no-load voltage of the alternator 1. This adjustment is preferably made by means of resistors 42, but it may also be made by means of resistor 46. If now the load on the alternator is increased the alternator voltage will decrease and this will immediately change the bridge unbalance. The output voltage now instead of being the value A will be the value B which is less than its previous value. The output voltage is used for a negative bias on the grid of discharge device 47 so that the change in the difference voltage from value A to value B increases the grid potential in a positive direction to cause the discharge device to pass more current. The discharge device 47 amplifies the voltage difference and since its anode current circulates through the resistor 32 in the grid circuit of the valves 17, 18 and 19, the valves are caused by this action to pass more current and thereby increase the excitation of alternator 1. In the amplifier circuit it is preferable to use electric discharge devices having a high amplification factor and also a high resistance in the anode circuit in order to improve the sensitivity of the circuit, or more exactly to improve the regulation.

The particular method illustrated for controlling the output of the valves 17, 18 and 19 which are preferably of the type in which the average current output may be varied by varying the phase of the grid voltage with respect to the anode voltage, is as follows: In the usual tubes of this type feeding a non-inductive circuit, when the grid potential is 180 degrees out of phase with the anode potential the current starts virtually at the end of each cycle, whereas for the 90 degrees phase relation the current starts at the middle of the cycle and for the in-phase relation the current starts at the beginning of the cycle. However, since the valves are working into the field circuit 5 which is a relatively high inductive load, complete control can be obtained with substantially 90 degrees phase shift of the grid potential. This phase shift is obtained by increasing or decreasing the positive bias potential of the grids by means of the drop across resistor 32. In Fig. 3 I have represented diagrammatically by way of explanation the relation between the anode potential and grid potential of the valves 17, 18 and 19. Curve P represents the curve of anode potential and curve $G_1$, which is assumed to lag the anode potential by 90 degrees, represents the grid potential with zero voltage drop across the resistor 32 in the grid circuit of the valves or with zero bias potential. If it is assumed that the valves will conduct with zero applied grid potential then the valves will begin to conduct at the point $X_1$. If now the negative grid bias on the discharge device 47 is varied in a positive direction, or is decreased, its anode current will increase and thereby increase the voltage drop across the resistor 32. The increase in voltage drop across resistor 32 is arranged to impress a positive bias on the grids of the electric valves so that the resulting grid potential curve is in effect shifted from the zero axis. The grid potential curve will be displaced as shown by $G_2$, and the valves will start conducting at the point $X_2$. If the voltage drop across the resistor 32 is increased still further in the same direction by varying the grid bias of the discharge device 47 the grid potential curve will be displaced as shown by $G_3$, and the valves will start conducting at the point $X_3$. In other words, by varying the direct current bias of the grid of discharge device 47 the output of the valves 17, 18 and 19 can be varied. The variation in the grid bias of the discharge device 47, as previously mentioned, is obtained from the bridge circuit. This circuit is so designed that if the alternating voltage to be regulated is varied, for example, one volt near, but not necessarily at the balance point, the voltage drop across the resistor 32 changes such that the output of the valves 17, 18 and 19 changes from the minimum to the maximum value. Since there is only one value of excitation which will satisfy the condition for a given voltage and load condition, the voltage will adjust itself until that excitation and that voltage is obtained.

The operating cycle of the regulating system as illustrated in Fig. 1 is substantially as follows: The operation is initiated by placing switch 6 in the illustrated position which puts exciter 4 on self-excitation through contacts 7–10 and 8–12. By means of the adjustable resistance 16 the excitation and thereby the voltage of alternator 1 is adjusted for the normal no-load value. When the alternator voltage builds up the cathodes of valves 17, 18 and 19 are heated by means of transformer 23. As soon as the valves have reached a temperature suitable for normal operation the switch 15 is closed and switch 6 is operated to close contacts 7 and 9 and 8 and 11 so as to connect field winding 5 to be energized from the circuit 2 through the valves 17, 18 and 19. It will be assumed that the bridge circuit has been adjusted to impress the voltage A of Fig. 2 on the grid of the discharge device 47 so that the output of the valves 17, 18 and 19 will be of the correct value to maintain the normal no-load voltage on alternator 1. If now, the load is increased on the alternator its voltage will decrease, which will immediately change the degree of unbalance in the bridge. The output voltage of the bridge will now change from the value A to the value B as illustrated in Fig. 2. This difference voltage B is less than its previous value so that the grid potential of the discharge device 47 is changed in a positive direction since the difference voltage is used as a negative bias. With the change of grid potential in a positive direction the anode current of the discharge device 47 increases and thereby increases the drop in potential across the resistor 32. This action as previously explained increases the output of the valves 17, 18 and 19 and thereby tends to restore the voltage of alternator 1 to normal.

In order to determine what the regulated voltage will now be under this new load condition, reference may be had to Fig. 4 in which the output of valves 17, 18 and 19 is plotted as a function of the regulated voltage. It will be observed that the output from the valves can be changed from the minimum to the maximum value with a small percentage change in the regulated voltage. The horizontal dotted line N illustrates the excitation required at no load, the line H the excitation required at half load, and the line F the excitation required at full load. The greater the sensitivity of the circuit or the more nearly the valve output line approaches the vertical, the smaller will be the change in the regulated voltage to increase the excitation from its minimum to its maximum value.

The variation in the regulated voltage with variation in load may be represented more simply by Fig. 5 in which the typical saturation curves of the alternator for no and full load 100% power factor are shown and plotted between alternator volts and alternator field excitation. A typical valve output curve is superimposed on the saturation curves. The intersection of the valve output or excitation curve and the saturation curves for any load and any power factor determines the regulated voltage for that load and power factor. The greatest deviation from the no-load value will occur at full load at the lowest lagging power factor. The effect of increasing the sensitivity of the regulating circuit is to make the power tube output curve more nearly horizontal reducing the deviation from no load to full load.

In order to explain more fully the action of the anti-hunting means, it will be assumed that the load on the alternator is zero and that the regulated voltage is equal to its normal no load voltage. If the load is suddenly increased, there will be a reduction of the voltage impressed on the bridge and consequently a tendency to change the voltage applied to the grid of the discharge device 47. A small change will immediately occur due to condenser 60 in the grid potential of the discharge device, tending to increase the excitation of the valves to increase the field excitation. At the same time current will start to flow through the resistance 58 and the condenser 59 also tending to change the grid potential of the discharge device in the proper direction to increase the valve output. The constants of these resistors and condensers are so chosen and adjusted that there will be a time delay before the potential on the grid of the discharge device is allowed to build up to any appreciable extent. Preferably the time constant of this control circuit should approach the time constant of the excitation circuit. As soon as the voltage of exciter 4 starts to increase, due to the initial action of the discharge device 47, a voltage will be immediately impressed across the resistor 56, the polarity of which is such as to tend to reduce the anode current of the discharge device and thereby the excitation of exciter 4 as soon as it exceeds the value required to produce the correct alternator field excitation for this new value of load. Since the voltage across resistor 56 changes exponentially with respect to time, if the constants of resistor 56 and condenser 57 are properly chosen, the anti-hunting voltage will disappear as the excitation approaches its correct value. This feature allows the regulator to take care of sudden applications or sudden reductions in load and is very important when the alternator is operated above its steady state power limit. The condenser 57 has a very valuable function in that it allows a practically instantaneous change in the grid voltage of the discharge device thereby compensating for the reduction in alternator voltage due to armature reaction.

In the modification illustrated in Fig. 6, I have shown an embodiment of my invention which is particularly adapted for controlling an alternator field winding directly without working through the customary exciter. The same general system as illustrated in Fig. 1 with the exciter omitted is shown in Fig. 6, and similar parts are designated by similar reference characters. The damping and quick response elements comprising respectively resistor 58 and condenser 59, and the condenser 60, are no longer required as the time delay of the exciter has been eliminated. The effect of armature reaction still exists and provision must be made to compensate for armature reaction. Since armature reaction is a function of the load current, this compensation is obtained by rectifying a current proportional to the load current and impressing this voltage on the same anti-hunting circuit as used in Fig. 1. As illustrated a current transformer 71 is connected in circuit with one of the conductors 2 and energizes an intermediate transformer 72. An adjustable resistor 73 is connected across the primary winding of transformer 72 for making adjustments in the regulating system. The secondary winding of transformer 72 is connected to the input terminals of a suitable rectifier 74 which for example may be of the dry-surface contact type similar to the rectifiers 38, 39 and 40. The direct current output terminals of the rectifier are connected across the resistor 56 through the condenser 57 just as the exciter voltage was applied to resistor 56 through condenser 57 in Fig. 1. A condenser 75 is connected in parallel with the direct current output terminals of the rectifier in order to by-pass the ripples in the direct current circuit from the rectifier. In this case, however, the polarity of the rectified voltage when applied to the anti-hunting circuit, comprising resistor 56 and condenser 57, is reversed so that with an addition in load on the alternator the output of the valves 17, 18 and 19 is increased, thereby preceding any change in the alternator voltage due to armature reaction. The amount of voltage introduced at this point in the circuit necessary to effect proper compensation should have a definite value. However, under the most common operating conditions a rough adjustment of the magnitude of the voltage introduced and of the constants of resistance 56 and condenser 57 will be sufficient, but in cases where the alternator is intended for operation above the steady state power limit, it may be necessary to adjust all of these values for the particular machine being regulated.

The operation of the modification of my invention illustrated in Fig. 6 is substantially the same as for the embodiment illustrated in Fig. 1 with the exception of the omission of the function of the exciter 4 and reversed operation of the anti-hunting means and it is believed the operation will be readily understood from the previous description without any further description.

While I have shown and described preferred embodiments of my invention, it will occur to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States, is,—

1. In a regulating system, an electric circuit, an electric valve provided with an anode, a cathode and a control electrode for controlling an electrical condition of said circuit, a source of alternating potential connected to energize the anode of said valve, means for impressing on said control electrode an alternating potential of substantially constant value and fixed phase relation with respect to said anode potential, and means for superimposing a unidirectional potential varying in accordance with the electrical condition to be regulated on the alternating potential of said control electrode in a manner to vary the conductivity of said valve in proportion to the deviation from a predetermined value of the electrical condition to be regulated.

2. The combination of an electric machine comprising excitation and armature circuits, an electric valve provided with an anode, a cathode, and a control electrode, for interconnecting said circuits, means for impressing on said control electrode an alternating potential of substantially constant value and fixed phase relation with respect to the anode potential, and means for superimposing a unidirectional potential on said alternating potential which varies in accordance with an electrical condition of said armature circuit and in a manner to render said valve conducting for periods varying in successive cycles in accordance with the deviation from normal of the electrical condition to be regulated.

3. The combination of an alternating current machine comprising excitation and armature circuits, an electric valve provided with an anode, a cathode, and a control electrode, for interconnecting said circuits, means for impressing on said control electrodes an alternating potential of substantially constant value and fixed phase relation with respect to the anode potential, and rectifying means connected to said armature circuit for superimposing a unidirectional potential on said alternating potential in a manner to vary the conductivity of said valve in proportion to the deviation from a predetermined value of the electrical condition to be regulated.

4. The combination of an alternating current machine comprising excitation and armature circuits, an electric valve provided with an anode, a cathode and a control electrode, for interconnecting said circuits, means for impressing on said control electrode an alternating potential of substantially constant value and fixed phase relation with respect to the anode potential, rectifying means connected to said armature circuit for superimposing a unidirectional potential on said alternating potential in a manner to vary the conductivity of said valve in proportion to the deviation from a predetermined value of the electrical condition to be regulated, and means responsive to an electrical condition of said excitation circuit for varying said unidirectional potential.

5. The combination of an alternating current machine comprising excitation and load circuits, an electric valve provided with an anode, a cathode, and a control electrode and connected to said load circuit and to said excitation circuit for controlling the voltage of said machine, means for impressing on said control electrode an alternating potential of substantially constant value and fixed phase relation with respect to the anode potential, rectifying means responsive to the voltage of said load circuit for superimposing a unidirectional potential on said alternating potential in a manner to change progressively the conductivity of said valve in proportion to the deviation of said load circuit voltage from a predetermined normal value, and means responsive to the voltage of said excitation circuit for inversely changing said unidirectional potential while said excitation voltage is changing.

6. In a regulating system, an alternating current generator, an electric discharge device having a control electrode, means for deriving from said alternating current generator a unidirectional voltage varying in accordance with an electrical condition of said generator, a network connected to be energized by said unidirectional voltage and arranged to furnish a difference voltage varying with respect to said unidirectional voltage in accordance with variations in said electrical characteristic, the control electrode of said discharge device being connected to said network to be energized by said difference voltage, an electric valve for controlling the excitation of said generator, and means energized in accordance with the current traversing said electric discharge device for controlling the current traversing said electric valve.

7. The combination of an alternating current machine comprising excitation and load circuits, a circuit comprising rectifying means connected to said load circuit for supplying a direct current voltage which varies above and below a predetermined value in accordance with variations of an electrical condition of said load circuit, an amplifier comprising an electric discharge device having an anode circuit and a control electrode, said control electrode being connected to be energized in accordance with variations in said direct current voltage, an electric valve provided with an anode, a cathode and a control electrode for interconnecting said excitation and load circuits, and means for varying the potential of the control electrode of said valve in accordance with variations in the anode current of said electric discharge device.

8. The combination of a polyphase alternating current machine comprising excitation and load circuits, rectifying means connected to all of the phases of said load circuit, a network having its input terminals connected to be energized from the direct current terminals of said rectifying means and normally adjusted to provide at its output terminals a difference voltage which is a function of said load circuit voltage, an amplifier comprising an electric discharge device having an anode circuit and a control electrode, said control electrode being connected in circuit with the output terminals of said network, a plurality of electric valves each provided with an anode, a cathode and a control electrode, for interconnecting said load circuit and said excitation circuit, means for impressing on the control electrodes of said valves an alternating potential having a predetermined phase relation with respect to the anode voltage, and a resistor connected in circuit with the control electrodes of said valves, said resistor being included in the anode circuit of said electric discharge device.

9. The combination of a polyphase alternating current machine comprising excitation and load circuits, rectifying means connected to all of the phases of said load circuit, a bridge circuit having input terminals connected to be energized from the direct current terminals of said rectifying means and normally adjusted to provide at its output terminals a difference voltage which varies in magnitude as a function of said load circuit voltage, an amplifier comprising an electric discharge device having an anode circuit and a control electrode, said control electrode being connected in circuit with the output terminals of said bridge, a plurality of electric valves, each provided with an anode, a cathode and a control electrode, for interconnecting said load circuit and said excitation circuit, means for impressing on the control electrodes of said valves a substantially constant alternating potential of a predetermined phase relation with respect to the anode voltage, a resistor connected in circuit with the control electrodes of said valves, said resistor being included in the anode circuit of said electric discharge device, means for varying the potential of the control electrode of said electric discharge device in accordance with only transient variations in the voltage of said excitation circuit.

10. In combination, a dynamo-electric machine, an excitation circuit therefor, an electric valve having an anode, a cathode and a control electrode, for controlling the energization of said excitation circuit, a circuit for supplying a unidirectional potential varying in magnitude inversely with the deviation of an electrical characteristic of said machine from a predetermined value, an electric discharge device provided with an anode circuit and having a grid connected to be biased to a negative potential by said unidirectional voltage, means responsive to an increase in an electrical characteristic of said excitation circuit for increasing said negative bias potential, and means for applying to the control electrode of said valve a positive bias potential which varies in accordance with the anode current of said electric discharge device.

11. In combination, an alternating current dynamo-electric machine, a field winding therefor, an electric valve having an anode, a cathode, and a control electrode, for controlling the energization of said field winding, a circuit for supplying a unidirectional voltage varying in magnitude from a negative value inversely with the deviation of the voltage of said machine from a predetermined value, an electric discharge device provided with an anode circuit and having a grid connected to be biased to a negative potential by said unidirectional voltage, means responsive to an increase in the current traversing said dynamo-electric machine for decreasing the negative bias potential of said discharge device, and means for applying to the control electrode of said valve a positive bias potential which varies in accordance with the anode current of said electric discharge device.

12. In combination, an alternating current dynamo-electric machine, an excitation winding therefor, an exciter for energizing said excitation winding, a field winding for said exciter, an electric valve having an anode, a cathode and a control electrode, for controlling the energization of said field winding, means for impressing on said control electrode an alternating potential of substantially constant value and phase relation with respect to the anode potential, a circuit for supplying a unidirectional voltage varying in magnitude from a negative value inversely with the deviation of the voltage of said machine from a predetermined value, an electric discharge device provided with an anode circuit and having a grid connected to be biased to a negative potential by said unidirectional voltage, means responsive to an increase in the voltage of said excitation circuit for increasing said negative bias potential, and means for applying to the control electrode of said valve a positive bias potential which varies in accordance with the anode current of said electric discharge device.

13. In combination, a dynamo-electric machine, an electric valve having an anode, a cathode and a control electrode, for controlling the excitation of said machine, means for varying the potential of said control electrode in accordance with variations in the voltage of said machine to control the transmission of current between said cathode and anode, and means operative when the current traversing said machine exceeds a predetermined value for taking over the control of the potential of said control electrode from said first-mentioned means.

14. In combination, a dynamo-electric machine, an electric valve having an anode, a cathode and a control electrode, for controlling the excitation of said machine, means for varying the potential of said control electrode in accordance with variations in the voltage of said machine to control the transmission of current between said cathode and anode, and a line drop compensator connected to modify the voltage of said first mentioned means.

15. In combination, a dynamo-electric machine, an electric valve having an anode, a cathode, and a control electrode, for controlling the excitation of said machine, means for varying the potential of said control electrode in accordance with variations in the voltage of said machine to control the transmission of current between said cathode and anode, and means operative in accordance with a component of reactive current in said machine for modifying the voltage of said first mentioned means.

16. In combination, an alternating current machine having an armature circuit and an excitation circuit, a bridge circuit, rectfying means interposed between said armature circuit and the input terminals of said bridge circuit, an electric discharge device provided with an anode circuit and having a grid circuit connected to be controlled in accordance with the output voltage of said bridge circuit, a resistor connected in series relation with said grid crcuit and connected to said excitation circuit, a condenser interposed between said excitation circuit and said resistor, an electric valve comprising an anode, a cathode, and a control electrode, connected to said excitation circuit for controlling the excitation of said machine, a second resistor connected in circuit with the control electrode of said valve and connected to be traversed by the anode current of said electric discharge device.

17. In combination, a polyphase alternating current machine having an armature circuit and an excitation winding, an exciter connected to energize said excitation winding, a field winding for said exciter, an electric valve having an anode, a cathode, and a control electrode, connected to be energized from said armature circuit and connected to energize said field winding, rectifying means connected to said armature circuit in a manner to provide a unidirectional voltage proportional to the voltage on all phases of said machine, a transformer interposed between said armature circuit and said rectifying means, a bridge circuit connected to be energized by the unidirectional voltage of said rectifying means, a resistor connected in series relation with the control electrode of said valve, an electric discharge device provided with an anode and a grid and having its anode circuit connected in series relation with said resistor, the output terminals of said bridge circuit being connected to said grid, means for effecting a change in the potential of said grid substantially simultaneously with a change in the voltage of said armature circuit, means for delaying the attainment of the final value of the grid potential corresponding to the change in the armature circuit voltage, means connected in circuit with said grid for changing the anode current of said discharge device inversely with the change in exciter voltage, a line drop compensator connected to modify the input voltage of said transformer, means for varying the input voltage to said transformer in accordance with a component of reactive current in said armature circuit, and means responsive to the current in said load circuit for energizing said bridge circuit when the current in said load circuit exceeds a predetermined value.

18. In a regulating system, an alternating current circuit, an electric valve for controlling an electrical condition of said circuit, means for controlling said valve, and a plurality of rectifying means connected to be energized respectively in accordance with different electrical conditions of said circuit for selectively energizing said valve controlling means.

19. In a regulating system, an alternating current circuit, an electric valve for controlling an electrical condition of said circuit, a plurality of rectifying means connected to be energized respectively in accordance with different electrical conditions of said circuit, and means connected to be operative in accordance with the relative magnitudes of the direct current voltages from the respective rectifying means for selectively controlling said valve.

20. In a regulating system, an alternating current circuit, an electric valve having a control electrode for controlling an electrical condition of said circuit, and rectifying means respectively connected to be energized in accordance with the voltage and current of said circuit and having their direct current terminals connected in parallel relation to said control electrode for controlling said valve in accordance with the direct current voltage from the rectifying means having the greater voltage.

21. The combination of an alternating current machine comprising excitation and armature circuits, an electric valve provided with an anode, a cathode, and a control electrode, for interconnecting said excitation and armature circuits, rectifying means connected to provide a direct current voltage varying in accordance with the voltage of said armature circuit, rectifying means connected to provide a direct current voltage varying in accordance with the current in said armature circuit, and means connected to be energized in accordance with the greater direct current voltage of said rectifying means for controlling said valve.

22. The combination of an electric machine comprising excitation and load circuits, an electric valve provided with an anode, a cathode and a control electrode, for interconnecting said excitation and load circuits, means for impressing a variable unidirectional potential on said control electrode in accordance with different electrical conditions of said load circuit, and means responsive to an electrical condition of said excitation circuit for modifying the action of said first-mentioned means.

23. In a regulating system, an electric valve having an anode, a cathode and a control electrode, for controlling the transmission of current between its anode and cathode, means for impressing on said control electrode an alternating potential of substantially constant value and displaced in phase less than 180 degrees with respect to the anode potential, means for superimposing a unidirectional potential on said alternating potential in a manner to vary the conductivity of said valve, and a relatively low impedance path connected between the cathode and control electrode of said valve for reducing the output thereof to zero at the maximum phase displacement between the potentials of said anode and control electrode.

24. In a regulating system, an electric valve having an anode, a cathode, and a control electrode, for controlling the transmission of current between its anode and cathode, an inductive circuit connected in the output circuit of said valve, means for impressing on said control electrode an alternating potential of substantially constant value and displaced in phase substantially 90 degrees with respect to the anode potential, means for superimposing a unidirectional potential on said alternating potential in a manner to vary the conductivity of said valve, and a capacitance connected between said cathode and said control electrode for reducing the output of said valve to zero at substantially 90 degrees phase displacement between the potentials of said anode and control electrode.

25. In combination, a dynamo-electric machine, an electric valve having an anode, a cathode, and a control electrode, for controlling an electrical characteristic of said machine, means for varying the potential of said control electrode in accordance with variations in an operating condition of said machine to control the transmission of current between said cathode and anode, and means including a resistor and a condenser operative only in response to transient variations of a variable condition of said machine tending to cause overshooting of said operating condition for modifying the potential of said control electrode to prevent hunting.

26. In combination, a dynamo-electric machine having an armature circuit and an excitation circuit, an electric valve having an anode, a cathode, and a control electrode, for controlling the excitation of said machine, means for varying the potential of said control electrode in accordance with variations in the voltage of said armature circuit to control the transmission of current between said cathode and anode, and means including a resistor connected in circuit with said control electrode and solely capacitively connected to be energized in accordance with an electrical characteristic of one of said machine circuits for modifying the potential of said control electrode to prevent hunting.

27. In combination, a dynamo-electric machine having an armature circuit and an excitation circuit, an electric valve having an anode, a cathode and a control electrode, for controlling the excitation of said machine, means for varying the potential of said control electrode in accordance with variations in the voltage of said armature circuit to control the transmission of current between said cathode and anode, and means including a resistor connected in circuit with said control electrode and solely capacitively connected to be energized in accordance with the voltage of said excitation circuit for modifying the potential of said control electrode to prevent hunting.

28. In combination, a dynamo-electric machine having an armature circuit and an excitation circuit, an electric valve having an anode, a cathode, and a control electrode for controlling the excitation of said machine, means for varying the potential of said control electrode in accordance with the voltage of said armature circuit to control the transmission of current between said cathode and said anode, and means including a resistor connected in circuit with said control electrode and operative in response to transient variations of the current in said armature circuit for modifying the potential of said control electrode to prevent hunting.

29. In combination, a dynamo-electric machine, an electric valve having an anode, a cathode and a control electrode, for controlling an electrical characteristic of said machine, means for varying the potential of said control electrode in accordance with variations in an operating condition of said machine to control the transmission of current between said cathode and anode, a resistor connected in circuit with said control electrode, means for obtaining a unidirectional electrical characteristic proportional to a variable condition of said machine tending to cause overshooting of said operating condition, and means including a condenser for effecting a change in the energization of said resistor sufficiently to modify the potential of said control electrode only during transient variations of said unidirectional electrical characteristic.

30. In combination, an alternating current dynamo-electric machine, a field winding therefor, means including an electric valve for controlling the energization of said field winding, said valve having an anode, a cathode, and a control electrode, a resistor connected in circuit with said control electrode, means including a rectifier for obtaining from said dynamo-electric machine a unidirectional component of voltage varying in accordance with the armature current of said machine, and means including a condenser for energizing said resistor in accordance with transient variations of said unidirectional component of voltage.

31. In combination, an alternating current dynamo-electric machine, a field winding therefor, an exciter for energizing said field winding, an electric valve for controlling the energization of said field winding, said valve being provided with an anode, a cathode, and a control electrode, means responsive to the voltage of said dynamo-electric machine for controlling said valve, a resistor connected in circuit with said control electrode, and means including a condenser for effecting a change in the energization of said resistor sufficiently to modify the potential of said control electrode only during transient variations of said exciter voltage.

GEORGE W. GARMAN.

CERTIFICATE OF CORRECTION.

Patent No. 2,002,371.  May 21, 1935.

GEORGE W. GARMAN.

It is hereby certified that error appears in the printed specification of the above numbered patent requiring correction as follows: Page 1, second column, line 15, for "organizations" read organization; page 4, first column, line 14, for "not" read now; and page 8, first column, line 9, claim 16, for "crcuit" read circuit; and that said Letters Patent should be read with these corrections therein that the same may conform to the record of the case in the Patent Office.

Signed and sealed this 25th day of June, A. D. 1935.

Bryan M. Battey (Seal)  Acting Commissioner of Patents.

DISCLAIMER 2,002,371.—*George W. Garman*, Scotia, N. Y. REGULATING SYSTEM. Patent dated May 21, 1935. Disclaimer filed March 12, 1936, by the assignee, *General Electric Company*.

Hereby enters this disclaimer of claim 1 of said patent.
[*Official Gazette March 31, 1936.*]